The specification in this patent
is not in print.
A. Munger.
9031X
Pendulum Level.
Patented Aug. 17, 1835.
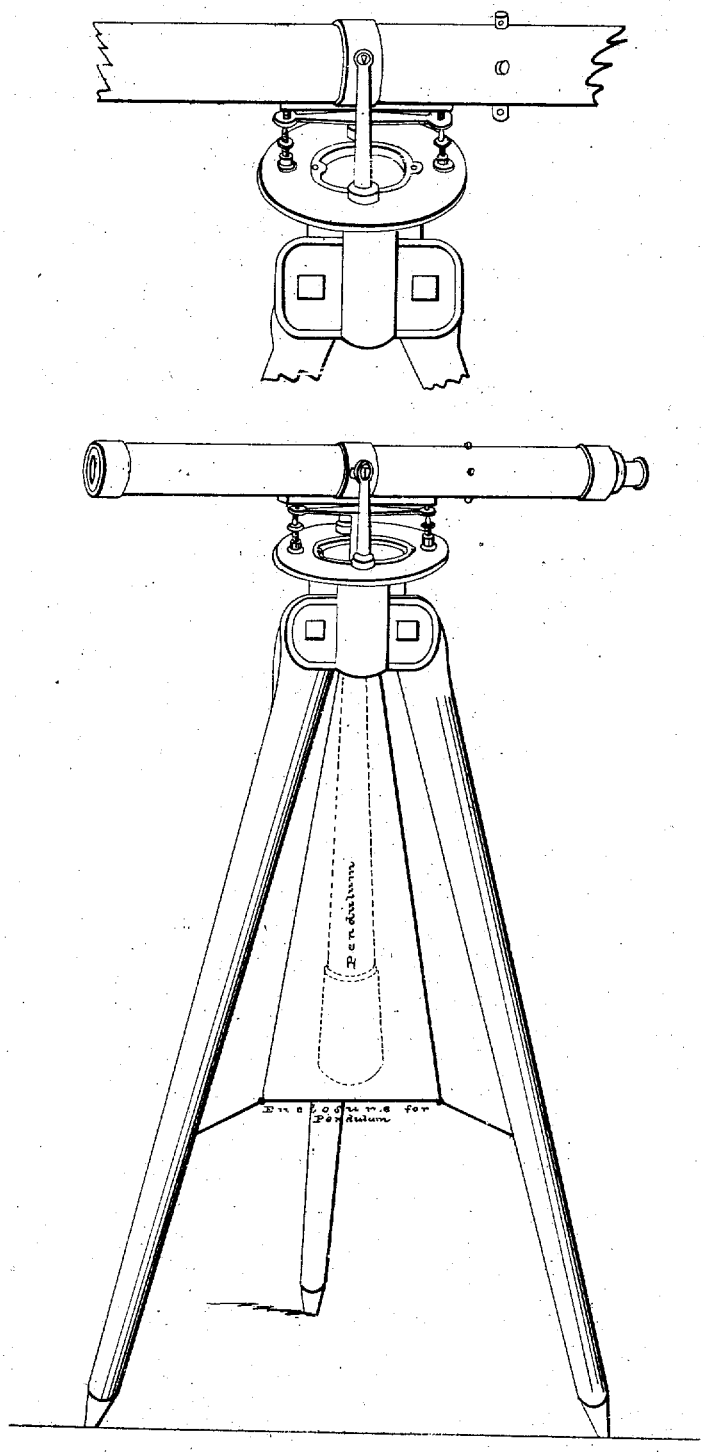
THE ECKERT LITHOGRAPHING CO., WASHINGTON, D. C.

Ar 1~ 547
Aug. 17. 1835
9031X

Asahel, Munger of Oberlin, State of Ohio

Letters Patent.

The schedule referred to in these Letters Patent and making part of the same containing a description in the words of the said Asahel Munger himself of his improvement in the Mathematical instrument called a pendulum Level, To all to whom these presents shall come, Be it known that I. Asahel Munger, of Oberlin in the County of Lorain and State of Ohio, have invented a new and useful improvement in the mathematicle instrument called a Level, and the following is a full and exact description of the construction and operation of said instrument as invented or improved by me This improvement consists principally and especially in attaching a tube or a strait bar with a sight at each end to the top of a pendilum in such a manner as to admit of being arranged or adjusted (either by screws or otherwise) at right angles with the pendilum and may be suspended within an enclosure of any kind, which shall protect it from the influence of currents of air so that when sustained by a tripedal or any convenient stand, the pendilum having a free vibration within its inclosure, comeing to rest by the power of its own gravity brings the sight to a perfect level The particular mode of suspending the pendilum being unimportant, needs no description, That part of the improvement which is claimed to be new and useful, indispensable and essential, and for which particularly Letters Patent are desired, consists in the union of the horizontal tube, or bar, with the pendulum forming thereby a single instrument, But it is contemplated using the same in connection with the compass and quadrant, As it is contemplated making the level of various materials, sizes & proportions that part of the subject is left to the choice and fancy of the manufacturer Asahel Munger, Witness { Levi Burnell
{ E. M. Johnson (Drawing)

Ex.
ClJW

[illegible] (Drawing) Patented August 17. 1835